US011102665B2

(12) United States Patent
Fischer

(10) Patent No.: US 11,102,665 B2
(45) Date of Patent: Aug. 24, 2021

(54) SUPPLEMENTAL VOLTAGE CONTROLLER FOR RADIO FREQUENCY (RF) ANTENNAS

(71) Applicant: T-Mobile USA, Inc., Bellevue, WA (US)

(72) Inventor: Steve Fischer, Windsor, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/281,019

(22) Filed: Feb. 20, 2019

(65) Prior Publication Data

US 2019/0268786 A1 Aug. 29, 2019

Related U.S. Application Data

(60) Provisional application No. 62/634,688, filed on Feb. 23, 2018.

(51) Int. Cl.
*H04W 24/04* (2009.01)
*H02J 9/06* (2006.01)
(Continued)

(52) U.S. Cl.
CPC .......... *H04W 24/04* (2013.01); *G05B 13/048* (2013.01); *H02J 9/061* (2013.01); *H04B 17/104* (2015.01); *H04W 88/08* (2013.01)

(58) Field of Classification Search
CPC ... H04W 24/04; H04W 88/08; H04W 52/143; H04W 52/44; H02J 9/061; H02J 13/0075;
(Continued)

(56) References Cited

U.S. PATENT DOCUMENTS 6,801,788 B1 10/2004 Csapo et al.
7,466,225 B2 12/2008 White et al.
(Continued)

FOREIGN PATENT DOCUMENTS

WO 2009143487 A2 11/2009
WO 2011115640 A1 9/2011

OTHER PUBLICATIONS

International Application No. PCT/US2019/022133, International Search Report and Written Opinion dated Jul. 2, 2019, 10 pages.
(Continued)

*Primary Examiner* — Shaima Q Aminzay
(74) *Attorney, Agent, or Firm* — Han Santos, PLLC

(57) ABSTRACT

This disclosure describes techniques for identifying and mitigating a voltage loss in a power transmission to a Remote Radio Unit (RRU) associated with Radio Frequency (RF) antennas of a telecommunications network. More particularly, a Supplemental Voltage (SV) controller is described that is configured to monitor and detect a change in voltage that occurs during a power transmission from a primary Direct Current (DC) power source to the RRU and selectively cause a supplemental DC power source to transmit a supplemental voltage to the RF antennas. The SV controller may cause a supplemental DC power source to transmit a supplemental voltage to the RRU based on an empirical data analysis, sensory data analysis, or current environmental metadata. Further, the SV controller may determine whether the primary DC power source has suddenly ceased transmitting power to the RRU, and in doing so, cease transmission of a supplemental voltage to the RRU.

17 Claims, 7 Drawing Sheets

(51) Int. Cl.
*H04B 17/10* (2015.01)
*G05B 13/04* (2006.01)
*H04W 88/08* (2009.01)

(58) Field of Classification Search
CPC .. H04B 17/104; H04B 17/391; H04B 17/102; G05B 13/048; G05B 11/32
USPC ........................................................ 455/522
See application file for complete search history.

(56) References Cited

U.S. PATENT DOCUMENTS

| | | |
|---|---|---|
| 7,904,115 B2 | 3/2011 | Hageman et al. |
| 8,547,164 B2 | 10/2013 | Flores et al. |
| 9,281,866 B2 | 3/2016 | Smentek et al. |
| 9,448,576 B2 | 9/2016 | Chamberlain et al. |
| 9,472,956 B2 | 10/2016 | Michaelis et al. |
| 9,485,723 B2 | 11/2016 | Chakraborty et al. |
| 9,681,317 B2 | 6/2017 | Carlin et al. |
| 9,759,880 B2 | 9/2017 | Chamberlain et al. |
| 10,128,685 B2 | 11/2018 | Hanley |
| 10,281,939 B2 | 5/2019 | Chamberlain et al. |
| 10,470,120 B2 | 11/2019 | Fischer |
| 2006/0182262 A1 | 8/2006 | Goldman et al. |
| 2007/0093204 A1 | 4/2007 | Kincard |
| 2011/0021186 A1* | 1/2011 | Fischer ............ H01Q 3/06 455/424 |
| 2013/0031387 A1 | 1/2013 | Whittam et al. |
| 2014/0378047 A1 | 12/2014 | Kennard |
| 2015/0015078 A1 | 1/2015 | Kim |
| 2015/0080055 A1 | 3/2015 | Smentek et al. |
| 2015/0109710 A1 | 4/2015 | Politis et al. |
| 2015/0168974 A1 | 6/2015 | Mascarenhas et al. |
| 2015/0326317 A1 | 11/2015 | Michaelis et al. |
| 2016/0316430 A1 | 10/2016 | Fischer |
| 2018/0164355 A1 | 6/2018 | Winkler et al. |
| 2018/0278054 A1* | 9/2018 | Johnson ............ H05K 5/0213 |
| 2019/0268786 A1 | 8/2019 | Fischer |

OTHER PUBLICATIONS

U.S. Appl. No. 16/194,200, Notice of Allowance dated Aug. 8, 2019, 27 pages.
U.S. Appl. No. 16/194,200, Notice of Allowance dated Apr. 25, 2019, 22 pages.
U.S. Appl. No. 16/281,007, Office Action dated Mar. 31, 2020, 15 pages.

* cited by examiner

SUPPLEMENTAL VOLTAGE CONTROLLER FOR RADIO FREQUENCY (RF) ANTENNAS

RELATED APPLICATIONS

This application claim priority to a commonly owned U.S. Provisional Patent Application No. 62/634,688 filed on Feb. 23, 2018, and titled "Supplemental Voltage Controller for Radio Frequency (RF) Antennas," which is herein incorporated by reference in its entirety.

BACKGROUND

The popularity of commercial wireless communication services (e.g. wireless telephony, wireless network access, and email services) have substantially increased during recent years. In many cases, users are increasingly relying on these services for both personal and business communications. Typically, telecommunication service providers rely on cell sites, such as base station nodes, to facilitate communication services and provide a reliable operation to their consumer base. However, at times, a cell site may unexpectedly experience a deficiency in a power transmission that impacts a quality of communication services. The deficiency in a power transmission may be caused by a power disruption to the RF antennas, albeit due to cell site hardware or software failures, or a surge in network congestion.

In some examples, a telecommunication service provider may be subject to significant financial expenditure as part of dealing with power interruptions, particularly when technicians are required to identify, mitigate, and/or repair the cause or effect of a power disruption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
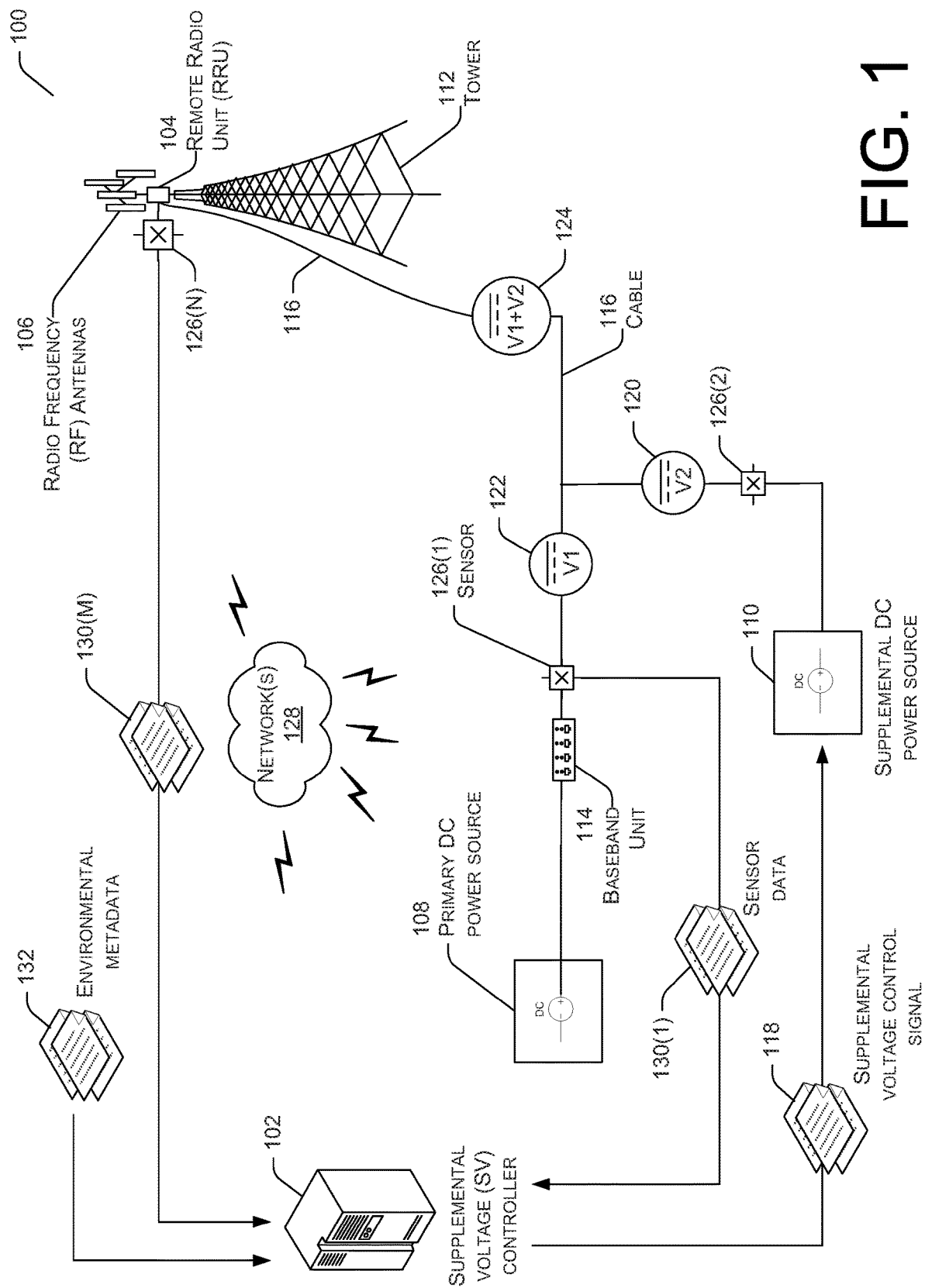
FIG. 1 illustrates an example architecture 100 of a Supplemental Voltage (SV) controller that is configured to mitigate the impact of a voltage loss in a power transmission to a Remote Radio Unit (RRU) associated with Radio Frequency (RF) antennas.

This disclosure describes techniques for identifying and mitigating a voltage loss associated with a power transmission to a Remote Radio Unit (RRU) that impacts an operation of Radio Frequency (RF) antennas associated with a telecommunications network. The voltage loss may be associated with a power disruption caused by a meteorological event, a power disruption caused by a base-station node hardware or software system failure, or any combination thereof. Further, the voltage loss may be caused by network congestion that exhausts a current power transmission drawn by the RRU. In any case, the voltage loss at the RRU may impact the operation of the RF antennas, which eventually impacts quality of communication services provided by the telecommunication service provider to its consumer base.

Accordingly, the present disclosure describes techniques that facilitate transmitting a supplemental voltage to the RRU to mitigate the impact of the voltage loss. In this way, the telecommunication service provider can ensure that the RF antennas are configured to maintain a threshold quality of communication services to its consumer base in spite of an unexpected voltage loss in power transmissions to the RRU.

More particularly, this disclosure describes a Supplemental Voltage (SV) controller that is configured to monitor and detect a change in voltage that occurs during a power transmission from a primary Direct Current (DC) power source to the RRU. In response to detecting a change in voltage that falls below a predetermined voltage threshold, the SV controller may transmit instruction to a supplemental DC power source that causes the supplemental DC power source to transmit a supplemental voltage output to the RRU. In this way, the combination of power transmissions from the primary DC power source and the supplemental DC power source may result in an overall power transmission to the RRU that has a voltage greater than or equal to the predetermined voltage threshold (i.e. lower limit of a predetermined voltage range).

In various example, a predetermined voltage range for operation of the RRU and RF antennas may be 50 volts to 57.5 volts, however, any predetermined voltage range is possible. Further, a drop of voltage in a power transmission to the RRU that falls below the predetermined voltage range (i.e. below 50 volts) may compromise an operation of the RRU, and ultimately the RF antennas. The drop of voltage in a power transmission may also impact a Quality of Service (QoS) parameter associated with signal data (i.e. voice and data communications) transmitted by the RF antennas. The QoS parameters may relate to packet loss, latency, jitter, echo, downlink throughput, uplink throughput, or any combination thereof.

Moreover, the SV controller may be configured to determine, via a look-up table analysis, an anticipated voltage of a power transmission delivered to the RRU from the primary DC power source. In this example, the sensor(s) may be positioned proximate to the primary DC power source to measure voltage output from the primary DC power source.

The sensor(s) may include a hall effect sensor that unobtrusively measures voltage in the electrically conductive cables. However, any type of sensor that can measure voltage can be used. Moreover, the SV controller may perform the look-up table analysis using voltage compensation tables that correlate voltage output from the primary DC power source with voltage loss that is expected to occur due to cable resistance along the cable length between the primary DC power source and the RRU. In this way, the SV controller may quantify a supplemental voltage output that is required from a supplemental DC power source that ensures that the voltage of the power transmission received at the RRU is within the predetermined voltage range (i.e. 50 volts to 57.5 volts).

Additionally, the SV controller may be configured to determine, via sensor data analysis, the voltage of a power transmission received at the RRU. In this example, the sensor(s) may be positioned proximate to the primary DC power source and the RRU to measure the voltage of a power transmission at each respective position. In doing so, the SV controller may determine a voltage loss that occurs between the primary DC power source and the RRU, based on the difference between the voltage measured proximate to the primary DC power source and the RRU. Accordingly, the SV controller may configure a supplemental DC power source to transmit a supplemental voltage output to the RRU to compensate for the voltage loss from the primary DC power source.

In another example, the SV controller may infer an additional voltage loss that is likely to occur during the transmission of the supplemental voltage output from the supplemental DC power source to the RRU. The SV controller may perform a look-up table analysis using voltage compensation tables that correlate voltage output from the supplemental DC power source with voltage loss that is expected to occur due to cable resistance along the cable length between the supplemental DC power source and the RRU. Moreover, the SV controller may refine the magnitude of the additional voltage loss from the supplemental DC power source using sensor data at the RRU following an initial transmission of the supplemental voltage output to the RRU.

In a first non-limiting example, the SV controller may determine, via a look-up table analysis or sensory data analysis, that the voltage of the power transmission delivered to the RRU is below a predetermined voltage threshold (i.e. 50 volts). In doing so, the SV controller may generate a supplemental voltage control signal that causes the supplemental DC power source to transmit a supplemental voltage output to the RRU. The supplemental voltage output is intended to be additive to the primary voltage output of the power transmission from the primary DC power source, such that net-voltage of the power transmission delivered to the RRU is greater than the predetermined voltage threshold (i.e. 50 volts), and within a predetermined voltage range (i.e. 50 volts to 57.5 volts). In this way, the SV controller can ensure that power transmissions delivered to the RRU do not compromise QoS parameters of voice and data communication signals transmitted by the RF antennas.

In a second non-limiting example, the SV controller may the SV controller may detect, via sensory data analysis, a sudden drop of voltage from the primary DC power source to the RRU. The sudden of voltage may reflect a system restart, a backhaul failure, or an intervening action that is intended to cease any and all power transmissions to the RF antennas. In doing so, the SV controller may cease transmission of a supplemental voltage from the supplemental DC power source to the RRU to avoid damaging the RRU and RF antennas.

In various examples, the SV controller may be configured to generate a supplemental voltage output based at least in part on environmental conditions that occur during a power transmission from the primary DC power source to the RRU. For example, the SV controller may capture current environmental metadata that impacts an operation of the RF antennas, and in doing so, determine whether an intervening environmental condition may necessitate a supplemental voltage output from the supplemental DC power source to the RRU. The current environmental metadata may correspond to periodic sampling of network congestion, network impediments (i.e. hardware or software-based), primary or supplemental DC power source impediments, or an indication of current or forecast meteorological events. In some examples, the current environmental metadata may further include QoS parameters associated with the RF antennas, such as data packet loss, data latency, jitter, echo, downlink throughput, uplink throughout, or any combination thereof.

The current environmental metadata may be sourced from the primary or supplemental DC power sources, baseband unit, RRU, RF antennas, an enterprise server of the telecommunications network, or a trusted third-party server affiliated with, or accessible by, the SV controller.

In this example, the SV controller may analyze the current environmental metadata and further determine whether to initiate a transmission of a supplemental voltage output from a supplemental DC power source to the RRU. The SV controller may use one or more trained machine learning algorithms to correlate current environmental metadata with historical environmental metadata to quantify a supplemental voltage that is required to maintain a threshold QoS for signal data (i.e. voice and data communications) transmitted by the RF antennas. The SV controller may assign a similarity score to each instance of historical environmental metadata based at least in part on a correlation with the current environmental metadata. In response to determining that a similarity score for an instance of historical environmental metadata is greater than or equal to a predetermined similarity threshold, the SV controller may infer a supplemental voltage output based on the historical supplemental voltage output associated with the instance of historical environmental metadata. Stated another way, the one or more trained machine learning algorithms may receive an input of current environmental metadata and output and infer a supplemental voltage The one or more trained machine-learning algorithms may make use of techniques such as supervised learning, unsupervised learning, semi-supervised learning, naive Bayes, Bayesian networks, decision trees, neural networks, fuzzy logic models, and/or probabilistic classification models.

Furthermore, the SV controller may generate an analysis model associated with power transmissions from the primary DC power source and the supplemental DC power source to the RRU over a predetermined time interval. The predetermined time interval may be 30 days, six months, one year, or five years, however, any predetermined time interval is possible. The analysis model may be developed based on historical power transmission data. The historical power transmission data may include a primary voltage output from the primary DC power source, a supplemental voltage output from the supplemental DC power source, the voltage loss that occurs during power transmissions to the RRU, the voltage of power transmissions at the RRU.

The analysis model may further correlate historical power transmission data with corresponding historical instances of environmental metadata. In this way, the analysis model may provide the SV controller with a platform to infer a supplemental voltage output based a at least in part on current environmental metadata and historical environmental metadata that is represented within the analysis model. Stated another way, the analysis model may receive an input of current environmental metadata and output an inferred voltage modification that is most similar to past events (i.e. historical instances of environmental metadata).

In a non-limiting example, the SV controller may analyze current environmental metadata associated with a power transmission to the RF antennas, and in doing so, identify the occurrence of a meteorological event. Using one or more machine-learning algorithms, the SV controller may correlate the current environmental metadata with data points of the analysis model and infer a supplemental voltage output that is likely required from a supplemental DC power source to ensure that an operation of the RF antennas is not compromised.

In another non-limiting example, the SV controller may analyze current environmental metadata associated with a power transmission to the RRU, and in doing so, infer a likely instance of network congestion. In this example, the SV controller may further use one or more machine-learning algorithms to correlate the current time of day and the current day of the week with historical environmental metadata, and in doing so, infer a likely instance of network congestion. Thus, the SV controller may preemptively cause a supplemental DC power source to transmit a supplemental voltage output to the RRU, based on the most similar historical environmental metadata (i.e. time of day and day of the week). Further, the SV controller may cause the supplemental DC power source to transmit the supplemental voltage output at a point-in-time prior to the impending network congestion such that the operation of the RRU is not compromised when the network congestion occurs.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an example architecture 100 of a Supplemental Voltage (SV) controller 102 that is configured to mitigate the impact of a voltage loss in a power transmission to a Remote Radio Unit (RRU) 104 associated with Radio Frequency (RF) antennas 106. In the illustrated example, the SV controller 102 may be communicatively coupled to a primary DC power source 108 and a supplemental DC power source 110 and configured to monitor the delivery of power transmissions from the primary DC power source 108 and the supplemental DC power source 110 to the RRU 104.

In the illustrated example, the RF antennas 106 may be located at or near the top of a tower 112. A radio and transceiver may be located at the top of the tower 112 and are typically referred to as the RRU 104. The RRU 104 may also be referred to as a remote radio head (RRH). The RRU 104 may significantly improve the quality of the cellular data signals that are transmitted and received by the one or more RF antennas 106 through a reduction in signal transmission losses and noise.

The RRU 104 may be configured to receive digital information and control signals from a baseband unit 114 and further modulate this information into a radio frequency (RF) signal that is then transmitted through the RF antennas 106. The RRU 104 may also receive RF signals from the RF antennas 106, demodulate the RF signals, and supply the demodulated signals to the baseband unit 114.

The baseband unit 114 may be configured to process the demodulated signals received from the RRU 104 into a format suitable for transmission over a backhaul communication system of a telecommunications network. The baseband unit 114 may also process signals received from the backhaul communication system and supply the processed signals to the RRU 104 for modulation into RF signals.

In one example, the RRU 104 may be located at the top of the tower 112 to reduce the signal loss between the RRU 104 and the RF antennas 106. For example, if the RRU 104 were located at the bottom of the tower 112, a cable 116 must extend up the tower to the RF antennas 106, a distance of 100 to 200 feet or more, causing appreciable a signal loss in transmission signals at cellular frequencies (e.g. 1.8 GHz 3.0 GHz, etc.) over the cable 116. The signal loss may be somewhat mitigated by locating the RRU 104 at the top of the tower 112 near the one RF antennas 106, which reduces the required length of the cable 116.

In some examples, the baseband unit 114 may be located at the bottom of the tower 112. Note that signal loss in the cabling connection between the baseband unit 114 at the bottom of the tower 112 and the RRU 104 at the top of the tower 112 may be much smaller, as compared to the signal loss associated with locating the RRU 104 at the bottom of the tower 112, because the signals between the baseband unit 114 and the RRU 104 are transmitted at baseband frequencies as opposed to RF frequencies.

In the illustrated example, the primary DC power source 108 may generate a suitable direct current ("DC") power signal for powering the baseband unit 114 and the RRU 104. The RRU 104 is often powered by a (nominal) 48 Volt DC power supply in cellular systems that are currently in use today. However, as mentioned above, the RRU 104 is typically located at or near the top of the tower 112, whereas the primary DC power source 108 is located within an enclosure at or near the base of the tower 112. Accordingly, the power transmission generated by the primary DC power source 108 may be routed up the tower 112 for a significant distance. In the illustrated example, the power is delivered up the tower 112 to the RRU 104 via a cable 116. The cable 116 may be a hybrid connector system (HCS) cable that combines fiber communications (i.e. fiber optic cable connected to the baseband unit 114) and the DC power into a single cable.

Due to a variety of factors, such as cable run distance, load, and environment (e.g. temperature), the power transmitted by the primary DC power source 108 over the cable 116 may experience a voltage loss. Accordingly, the SV controller 102 may be configured to detect a voltage loss in the delivery of a power transmission from the primary DC power source 108 to the RRU 104. To compensate for the voltage loss, the SV controller 102 may initiate the delivery of a supplemental voltage output (V2) 110 from a supplemental DC power source 110 to the RRU 104. More specifically, the SV controller 102 may transmit a supplemental voltage control signal 118 to the supplemental DC power source 110 that initiates delivery of a supplemental voltage output, namely V2 120 to the RF antennas 106. The supplemental voltage output V2 120 is intended to be additive to the primary voltage output (V1) 122 such that the net-voltage of the power transmission (V1+V2) 124 delivered to the RRU 104 is within the predetermined voltage range (i.e. 50 volts to 57.5 volts). The predetermined voltage range may correspond to a voltage range required to maintain a QoS in voice and data communications via the RF antennas 106. The predetermined voltage threshold may be set by an operator of the SV controller 102 or an administrator of the telecommunications network. In this way, the SV controller 102 can ensure an operation of the RF antennas is not compromised by a voltage loss in the power transmission.

In another example, the SV controller 102 may detect a sudden drop in V1 122 of the power transmission from the primary DC power source 108 to the RRU 104. An indication of the voltage drop may be based on the rate of change of the V1 122 over a predetermined time interval, or the magnitude of V1 122 falling below a predetermined minimum voltage threshold. The predetermined minimum voltage threshold may be set by an operator of the SV controller 102 or an administrator of the telecommunications network an may be independent of the predetermined voltage range (i.e. 50 volts to 57.5 volts). The sudden drop in V1 122 may reflect a system restart, a backhaul failure, or an intervening action that is intended to cease any and all power transmissions to the RF antennas 106. In this example, the SV controller 102 may transmit a supplemental voltage control signal 118 to the supplemental DC power source 110 that causes the supplemental DC power source 110 to cease any power transmissions to the RF antennas 106.

Additionally, the primary DC power source 108 and the supplemental DC power source 110 may be electrically coupled to the RRU 104 via cable 116.

Moreover, the SV controller 102 may be communicatively coupled to one or more sensor(s) 126(1)-126(N) via one or more network(s) 128. The one or more sensor(s) 126(1)-126(N) may be positioned at various locations along the cable 116 including adjacent to the primary DC power source 108, the supplemental DC power source 110, the baseband unit 114, the RRU 104, the RF antennas 106, and any combination thereof. The one or more sensor(s) 126(1)-126(N) may include hall effect sensors that unobtrusively measure voltage in the cable 116, however, any type of sensor that can measure voltage, obtrusively or unobtrusively, can be used.

In some examples, the SV controller 102 may monitor and analyze sensor data 130(1)-130(M) from the one or more sensor(s) 126(1)-126(N) to quantify a voltage loss that occurs during a power transmission to the RRU 104. For purposes of clarity, FIG. 1 illustrates the SV controller 102 retrieving sensor data 130(1) and 130(M) from sensors 126(1), 126(2), and 126(N) adjacent to the primary DC power source 108, the supplemental DC power source 110, and the RRU 104, respectively. However, sensor data may be retrieved from any one of the one or more sensor(s) 126(1)-126(N). Moreover, the SV controller 102 may infer a voltage loss in a power transmission at the RRU 104 based on a combination of sensor data 130(1)-130(M) and empirical data accessible by the SV controller 102.

Additionally, the SV controller 102 may capture current environmental metadata 132 that may impact an operation of the primary DC power source 108, the supplemental DC power source 110, the RRU 104, the RF antennas 106, or any combination thereof. The current environmental metadata 132 may include periodic samplings of network congestion, network impediments (i.e. hardware or software-based), primary and supplemental DC power source impediments, meteorological events, or any combination thereof. The current environmental metadata 132 may also include a calculation of, or pertinent data used to calculate, current QoS parameters associated with signal data (i.e. voice and data communications) transmitted by the RF antennas. The SV controller 102 may retrieve the current environmental metadata 132 from the primary DC power source 108, the supplemental DC power source 110, the baseband unit 114, the RRU 104, the RF antennas 106, enterprise servers associated with the telecommunications network, or other trusted third-party servers affiliated with, or accessible by, the SV controller 102, via the one or more network(s) 128.

In various examples, the SV controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s) 128.

Moreover, the one or more network(s) 128 may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
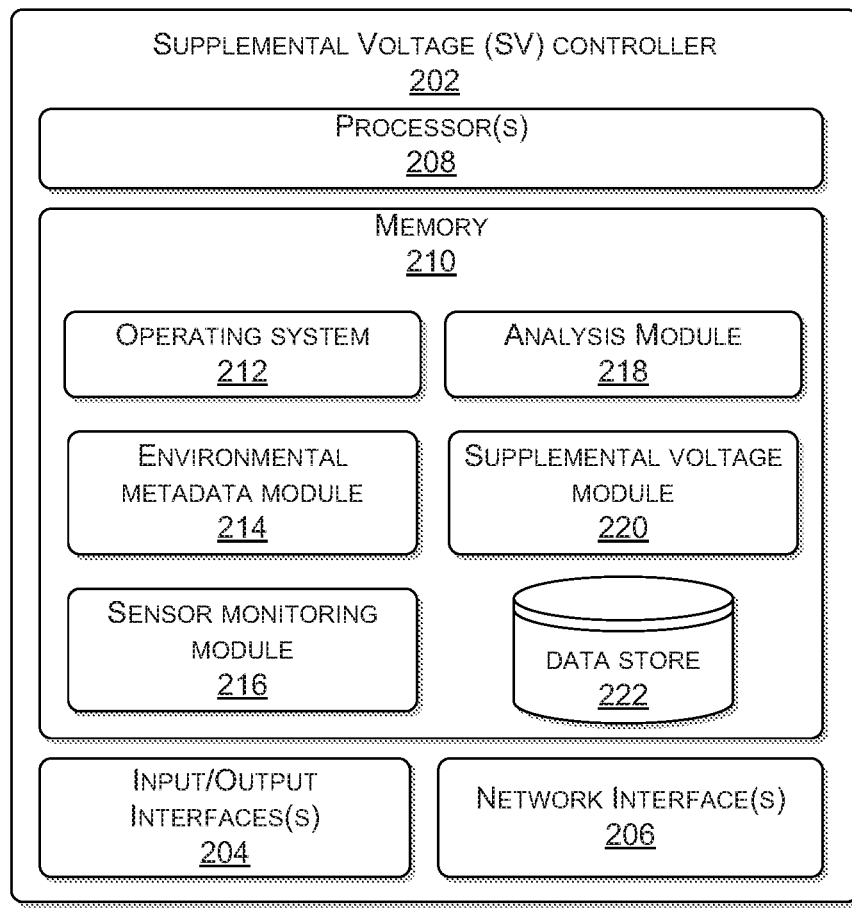
FIG. 2 illustrates a block diagram of various components of a Supplemental Voltage (SV) controller.

FIG. 2 illustrates a block diagram of various components of a Supplemental Voltage (SV) controller. The SV controller 202 may include routines, program instructions, objects, and/or data structures that perform particular tasks or implement abstract data types. Further, the SV controller 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the SV controller 202 may include the network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the SV controller 202 may include one or more processor(s) 208 that are operably connected to memory 210. In at least one example, the one or more processor(s) 208 may be a central processing unit(s) (CPU), graphics processing unit(s) (GPU), or both a CPU and GPU or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or non-volatile (ROM) memory.

In some examples, memory 210 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, an environmental metadata module 214, a sensor monitoring module 216, the analysis module 218, a supplemental voltage module 220, and a data store 222. The operating system 212 may be any operating system capable of managing computer hardware and software resources.

The environmental metadata module 214 may be configured to capture environmental metadata that impacts an operation of the RF antennas. The environmental metadata may include periodic samples of network congestion, network impediments (i.e. hardware or software-based), primary or supplemental DC power source impediments, meteorological events, or any combination thereof. The environmental metadata may further include a calculation of, or pertinent data used to calculate, QoS parameters associated signal data (i.e. voice and data communications) transmitted by the RF antennas. The QoS parameters may include data packet loss, data latency, jitter, echo, downlink throughput, uplink throughput, or any combination thereof. Each instance of environmental metadata may include a corresponding indication of a related time of day and a day of the week.

The environmental metadata module 214 may capture the environmental metadata from the primary DC power source, the supplemental DC power source, the baseband unit, the RRU, the RF antennas, enterprise servers associated with the telecommunications network, or a trusted third-party server affiliated with, or accessible by, the SV controller.

The sensor monitoring module 216 may be configured to monitor and retrieve sensor data from one or more sensor(s) positioned between the primary DC power source, the supplemental DC power source, the baseband unit, the RRU, and the RF antennas. The sensor data may indicate the voltage of a power transmission at each discrete sensor location. The sensor monitoring module 216 may monitor and retrieve sensor data from each, or a select number of sensor(s), on a continuous basis, per a predetermined schedule, or in response to a triggering event. The predetermined schedule may be based on a time interval of one hour, six hours, or 12 hours. Any time interval is possible. Further, the triggering event may be based on current environmental metadata that indicates network congestion, network impediments, or a current or forecast meteorological event. The triggering event may also correspond to receipt of an indication that at least one QoS parameter associated with the operation of the RF antennas has fallen below a predetermined QoS threshold. The predetermined QoS threshold may be set by an operator of the SV controller 202 or an administrator of the telecommunications network.

The analysis module 218 may be configured to analyze sensor data and determine whether to initiate delivery of supplemental voltage from a supplemental DC power source to the RRU. In one example, the analysis module 218 may determine that a supplemental voltage output is required to mitigate a voltage loss at the RRU. The voltage loss may occur during a power transmission from the primary DC power source to the RRU. The analysis module 218 may quantify the voltage loss based on sensor data at the RRU. Alternatively, the voltage loss may be based on a combination of sensor data and empirical data. The empirical data may include voltage compensation tables that correlate voltage output from the primary and/or supplemental DC power source with voltage loss that is expected to occur along the length of the cable to the RRU.

For example, the analysis module 218 may capture sensor data from sensors positioned at or near the primary DC power source, or any other location between the primary DC power source and/or supplemental DC power source and the RRU. In doing so, the analysis module 218 may use voltage compensation tables (i.e. empirical data) to infer a voltage loss that is expected to occur along a length of cable from the primary and/or supplemental DC power source to the RRU. In some examples, the voltage compensation tables may be based on cable properties of the cables, such as cable length, cable resistance coefficient, and cable diameter.

Furthermore, the analysis module 218 may analyze sensor data from sensors at or near the primary DC power source to detect a sudden drop in primary voltage output from the primary DC power source to the RRU. An indication of the voltage drop may be based on the rate of change of the primary voltage output over a predetermined time interval or a magnitude of the primary voltage output falling below the predetermined minimum voltage threshold. The sudden drop in primary voltage output may reflect a system restart, a backhaul failure, or an intervening action that is intended to cease any and all power transmissions to the RF antennas. In this example, the analysis module 218 may determine whether to cease a transmission of the supplemental voltage output from the supplemental DC power source based on the detection of the sudden drop in primary voltage output from the primary DC power source.

Additionally, the analysis module 218 may retrieve, from the data store 222, historical power transmission data associated with the RRU. The historical power transmission data may include a primary voltage output from the primary DC power source, a supplemental voltage output from the supplemental DC power source, the voltage loss that occurs during power transmissions to the RRU, and the voltage of power transmissions at the RRU. The analysis module 218 may also employ one or more trained machine learning algorithms to infer a supplemental voltage output based at least in part on a correlation of the current primary voltage output from the primary DC power source and an instance of historical primary voltage output from the historical power transmission data. Stated another way, the analysis module 218 may receive an input of current voltage output from the primary DC power source and output an inferred supplemental voltage output that is most similar to a past event (i.e. instance of historical supplemental voltage output from the historical power transmission data).

In another example, the analysis module 218 may infer a supplemental voltage output based at least in part on current environmental metadata. For example, the analysis module 218 may retrieve, from the data store 222, historical instances of supplemental voltage output that occur in response to historical environmental metadata. The analysis module 218 may further use one or more trained machine-learning algorithms to correlate current environmental metadata with historical environmental metadata to infer a supplemental voltage output. Stated another way, the analysis module 218 may receive an input of current environmental metadata and output an inferred supplemental voltage output that is most similar to a past event (i.e. historical instance of environmental metadata).

Moreover, the analysis module 218 may further generate an analysis model by correlating historical power transmission data with corresponding historical instances of environmental metadata. The analysis module 218 may continuously evaluate historical power transmission data and historical environmental metadata to progressively refine the analysis model. As more historical power transmission data and historical environmental data becomes available, a continuously more accurate analysis model can be developed.

The analysis module 218 may employ one or more trained machine learning algorithms to determine the similarity between current environmental metadata and/or power transmission data with data-points of the analysis model. The similarity may be determined by measuring the Euclid distance between the current environmental metadata and/or power transmission data with data-points of the analysis model. In doing so, the analysis module 218 may infer a power interruption event that may impact an operation of RF antennas and further infer a voltage loss that may occur at the RRU.

The analysis module 218 may assign a similarity score to each data-point of the analysis model based at least in part on its correlation with current environmental metadata and/or current power transmission data. The analysis module 218 may infer a supplement voltage output based on the similarity score of a data-point being greater than or equal to a predetermined similarity threshold. Stated another way, the analysis module 218 may receive an input of current environmental metadata and/or current power transmission data and output an inferred supplemental voltage output that is most similar to a past event (i.e. data-point within the analysis model).

The similarity score assigned to each data-point of the analysis model may be an alpha-numeric expression (i.e. 0 to 10, or A to F), a descriptive expression (i.e. low, medium, or high), based on color (i.e. red, yellow, or green), or any other suitable scale that reflects a degree of correlation between real-time and historical environmental metadata. The predetermined similarity threshold may be set by an operator of the SV controller or an administrator of the telecommunications network.

The supplemental voltage module 220 may be configured to generate and deploy a supplemental voltage control signal to a supplemental DC power source. In one example, the supplemental voltage control signal may cause the supplemental DC power source to initiate delivery of a supplemental voltage output to the RRU.

In another example, the supplemental voltage control signal may cause the supplemental DC power source to cease delivery of a supplemental voltage output to the RRU. In this example, the supplemental voltage module 220 may receive an indication from the analysis module 218 to cease transmission of the supplemental voltage output based at least in part on a sudden drop in primary voltage output from the primary DC power source. The sudden drop in primary voltage output may reflect a system restart, a backhaul failure, or an intervening action that is intended to cease any and all power transmissions to the RRU.

In another example, the supplemental voltage module 220 may include instructions to initiate delivery of supplemental voltage output to the RRU at, or prior to, a particular point-in-time of an inferred voltage loss. For example, the analysis module 218 may infer that network congestion impacting an operation of the RF antennas is likely to occur at a particular point-in-time. Subsequently, the analysis module 218 may determine that delivery of a supplemental voltage output to the RF antennas at, or prior to, the particular point-in-time may compensate for the voltage loss at the RRU. Thus, the supplemental voltage module 220 may generate a supplemental voltage control signal that causes the supplemental DC power source to initiate delivery of the supplemental voltage output at, or prior to, the particular point-in-time.

The data store 222 may be configured to store historical instances of environmental metadata, historical power transmission data (i.e. primary voltage output and supplemental voltage output) and corresponding indications to a related time of day and a day of the week.

FIGS. 3, 4, 5, 6, and 7 present processes 300 through to 700 that relate to operations of the Supplemental Voltage (SV) controller. Each of processes 300 through to 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 through to 700 are described with reference to the example architecture 100 of FIG. 1.

Figure 3:
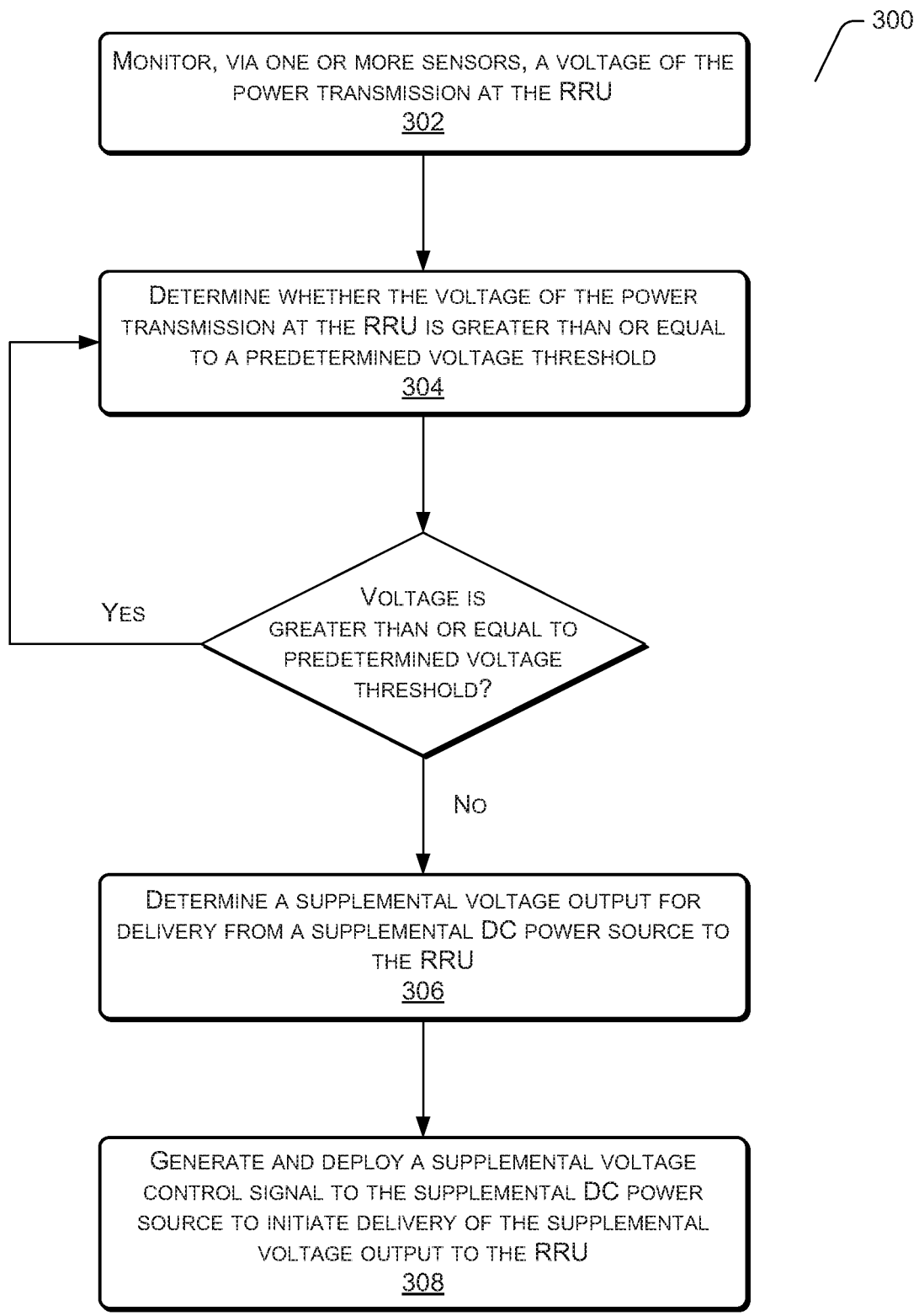
FIG. 3 illustrates a Supplemental Voltage (SV) controller process for performing an analysis of sensor data to quantify a supplemental voltage output to increase the voltage of a power transmission to a Remote Radio Unit (RRU).

FIG. 3 illustrates a Supplemental Voltage (SV) controller process for performing an analysis of sensor data to quantify a supplemental voltage output to increase the voltage of a power transmission to a Remote Radio Unit (RRU). In one example, the supplemental voltage output may be intended to mitigate at least a portion of voltage loss that occurs via electrically conductive cables that electrically couple a primary DC power source and the RRU. In another example, the supplemental voltage output may be intended to ease the workload on a primary DC power source in the event that the primary DC power source experiences hardware or software-based impediments. In yet another example, the supplemental voltage output may be intended to increase the net-voltage of the power transmission at the RRU in response to indications of network congestion.

At 302, the SV controller may monitor, via one or more sensor(s), a voltage of the power transmission at the RRU. The one or more sensor(s) may be positioned proximate to the RRU. Further, the one or more sensor(s) may be hall effect sensors that unobtrusively measure voltage in cables, however, any type of sensor that can measure voltage, obtrusively or unobtrusively, can be used.

At 304, the SV controller may determine whether the voltage of the power transmission at the RRU is equal to or greater than a predetermined voltage threshold. The SV controller may determine the voltage of the power transmission at the RRU based at least in part on sensor data from the one or more sensor(s) proximate to the RRU.

At 306, the SV controller may determine that the voltage of the power transmission at the RRU is less than the predetermined voltage threshold. In other words, the voltage of the power transmission at the RRU is too low and may impact the QoS parameters associated signal data transmitted by the RF antennas.

In doing so, the SV controller may determine a supplemental voltage output for delivery from a supplemental DC power source to the RRU. The supplemental voltage output is intended to be additive to the primary voltage output of the power transmission from the primary DC power source, such that net-voltage of the power transmission delivered to the RRU is greater than the predetermined voltage threshold (i.e. 50 volts), and within a predetermined voltage range (i.e. 50 volts to 57.5 volts).

Alternatively, the SV controller may determine that the voltage of the power transmission at the RRU is greater than or equal to the predetermined voltage threshold. Stated another way, the voltage of the power transmission at the RRU is unlikely to impact the QoS parameters associated with signal data transmitted by the RF antennas. In this instance, process 300 may return to step 302 and the SV controller may continue monitoring, via one or more sensor(s), the voltage of the power transmission at the RRU.

At 308, the SV controller may generate and deploy a supplemental voltage control signal to the supplemental DC power source. The supplemental voltage control signal may include a supplemental control signal that dynamically causes the supplemental DC power source to transmit the supplemental voltage output to the RRU.

Figure 4:
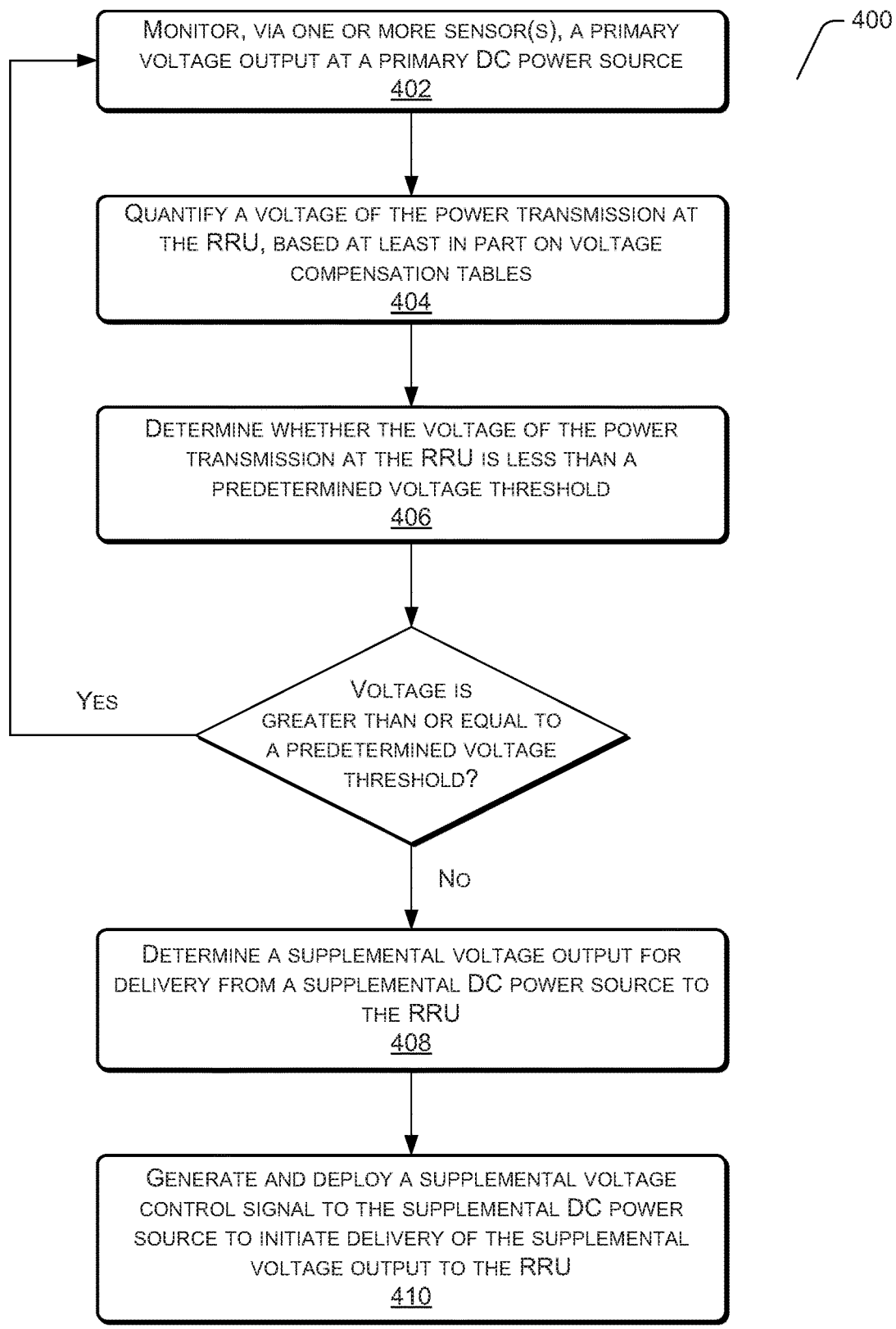
FIG. 4 illustrates a Supplemental Voltage (SV) controller process for performing an analysis using voltage compensation tables to quantify a supplemental voltage to increase the voltage of a power transmission to a Remote Radio Unit (RRU).

FIG. 4 illustrates a Supplemental Voltage (SV) controller process for performing an analysis using voltage compensation tables to quantify a supplemental voltage to increase the voltage of a power transmission to a Remote Radio Unit (RRU). The voltage compensation tables may correlate primary voltage output from a primary DC power source with voltage loss that is expected to occur due to cable resistance along the length of cables between the primary DC power source, the supplemental DC power source, and the RRU. It is noteworthy that the voltage loss is directly proportional to the length of the cables.

At 402, the SV controller may monitor, via one or more sensor(s), a primary voltage output from a primary DC power source. The SV controller may monitor the one or more sensor(s) on a continuous basis, per a predetermined schedule, or in response to a triggering event. The predetermined schedule may be based on a time interval of one hour, six hours, or 12 hours. Any time interval is possible. Further, the triggering event may be based on current environmental metadata that indicates network congestion, network impediments, or a current or forecast meteorological event. The triggering event may also correspond to receipt of an indication that at least one QoS parameter associated with the operation of the RF antennas has fallen below a predetermined QoS threshold.

At 404, the SV controller may quantify a voltage of the power transmission at the RRU based at least in part on the voltage compensation tables. The SV controller may receive an input of primary voltage output at the primary DC power source, and using the voltage compensation tables, output the voltage of the power transmission at the RRU. In some examples, the voltage compensation tables may be based on cable properties, such as cable length, cable resistance coefficient, and cable diameter.

At 406, the SV controller may determine whether the voltage of the power transmission at the RRU is greater than or equal to a predetermined voltage threshold. The predetermined voltage threshold may be set by an operator of the SV controller or an administrator of the telecommunications network.

At 408, the SV controller may determine that the voltage of the power transmission at the RRU is less than the predetermined voltage threshold. In other words, the voltage of the power transmission at the RRU antennas is too low and may impact the QoS parameters associated signal data transmitted by the RF antennas.

In doing so, the SV controller may determine a supplemental voltage output for delivery from a supplemental DC power source to the RRU. The supplemental voltage output is intended to be additive to the primary voltage output such that net-voltage of the power transmission delivered to the RRU is greater than the predetermined voltage threshold (i.e. 50 volts), and within a predetermined voltage range (i.e. 50 volts to 57.5 volts).

Alternatively, the SV controller may determine that the voltage of the power transmission at the RF antennas is greater than or equal to the predetermined voltage threshold and within the predetermined voltage range (i.e. 50 volts to 57.5 volts). Thus, process 400 may return to step 402 and the SV controller may continue monitoring, via one or more sensor(s), the primary voltage output at the primary DC power source.

At 410, the SV controller may generate and deploy a supplemental voltage control signal to the supplemental DC power source that causes the supplemental DC power source to transmit the supplemental voltage output to the RRU.

Figure 5:
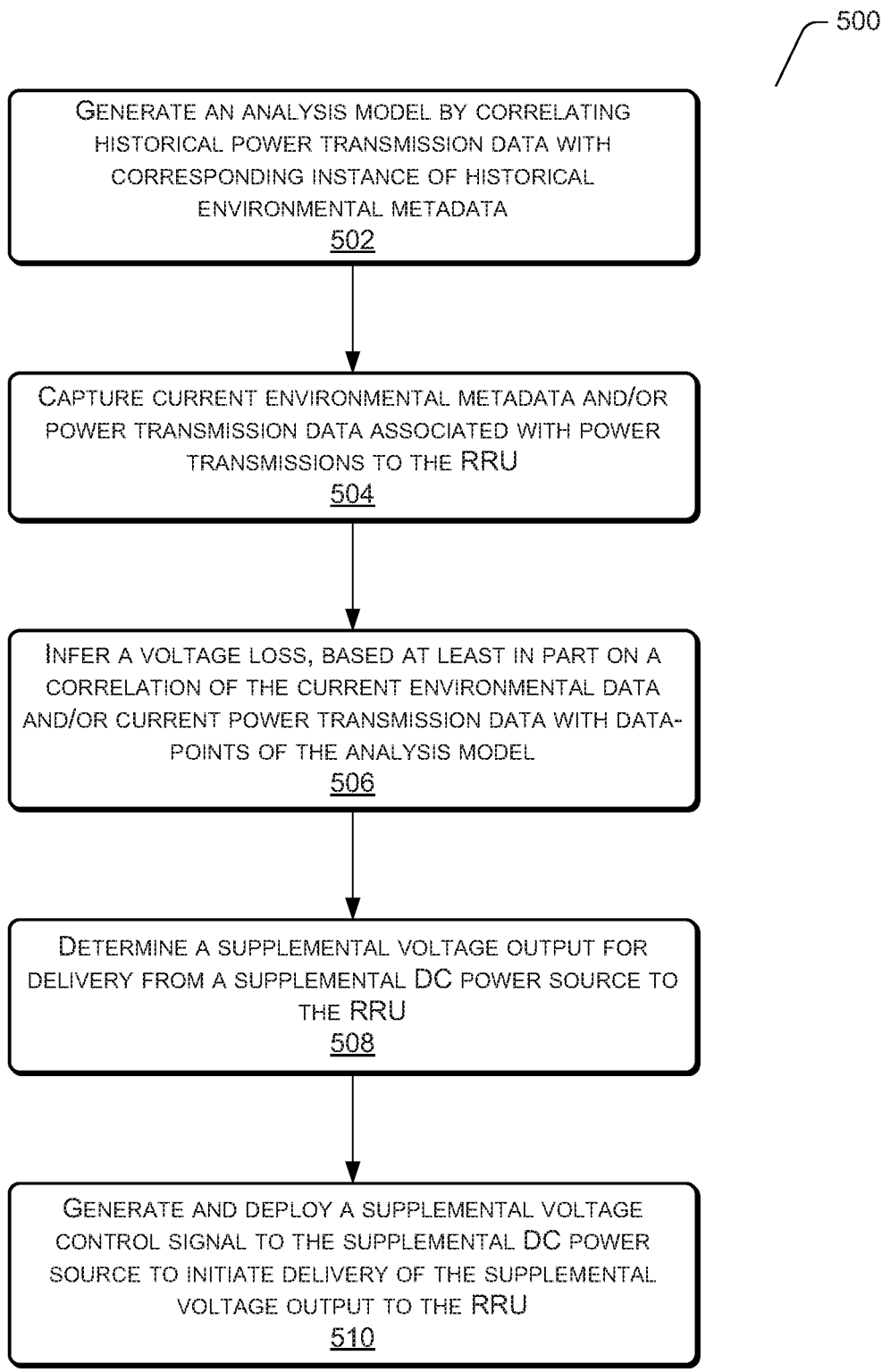
FIG. 5 illustrates an AVM controller process for generating an analysis model to preemptively infer power interruption events that impact QoS parameters associated with signal data (i.e. voice and data communications) transmitted by the RF antennas.

FIG. 5 illustrates an AVM controller process for generating an analysis model to preemptively infer power interruption events that impact QoS parameters associated with signal data (i.e. voice and data communications) transmitted by the RF antennas.

At 502, the SV controller may generate an analysis model by correlating historical power transmission data with corresponding historical instances of environmental metadata. The historical power transmission data may include a primary voltage output from the primary DC power source, a supplemental voltage output from the supplemental DC power source, the voltage loss that occurs during power transmissions to the RRU, and the voltage of power transmissions at the RRU. Further, the historical environmental metadata may include indications of network congestion, network impediments (i.e. hardware or software-based impediments), DC power source impediments, indications of current or forecast meteorological events, or Quality of Service (QoS) parameters associated with the RF antennas. Each instance of historical environmental metadata may include a corresponding indication of a related time of day and a day of the week.

At 504, the SV controller may capture current environmental metadata and/or current power transmission data associated with power transmissions to the RRU. The current power transmission data may be sourced from the primary and/or supplemental DC power sources, the baseband unit, and RRU. The current environmental metadata may be sourced from the primary or supplemental DC power sources, baseband unit, RRU, RF antennas, an enterprise server of the telecommunications network, or a trusted third-party server affiliated with, or accessible by, the SV controller.

At 506, the SV controller may correlate current environmental metadata and/or current power transmission data with data-points of the analysis model, and in doing so, infer a voltage loss that may occur between the primary DC power source and/or supplemental DC power source and the RRU. In some examples, the SV controller may employ one or more trained machine learning algorithms to assign a similarity score to each data-point of the analysis model based on its correlation with the current environmental metadata and/or current power transmission data. The SV controller may infer a supplemental voltage output based on the similarity score of data-point being greater than or equal to a predetermined similarity threshold.

At 508, the SV controller may determine a supplemental voltage output for delivery from the supplemental DC power source to the RRU, based at least in part on the inferred voltage loss. The supplemental voltage output may account for an additional voltage loss that is likely to occur between the supplemental DC power source and the RRU.

At 510, the SV controller may generate and deploy a supplemental voltage control signal to the supplemental DC power source that causes the supplemental DC power source to transmit the supplemental voltage output to the RRU.

Figure 6:
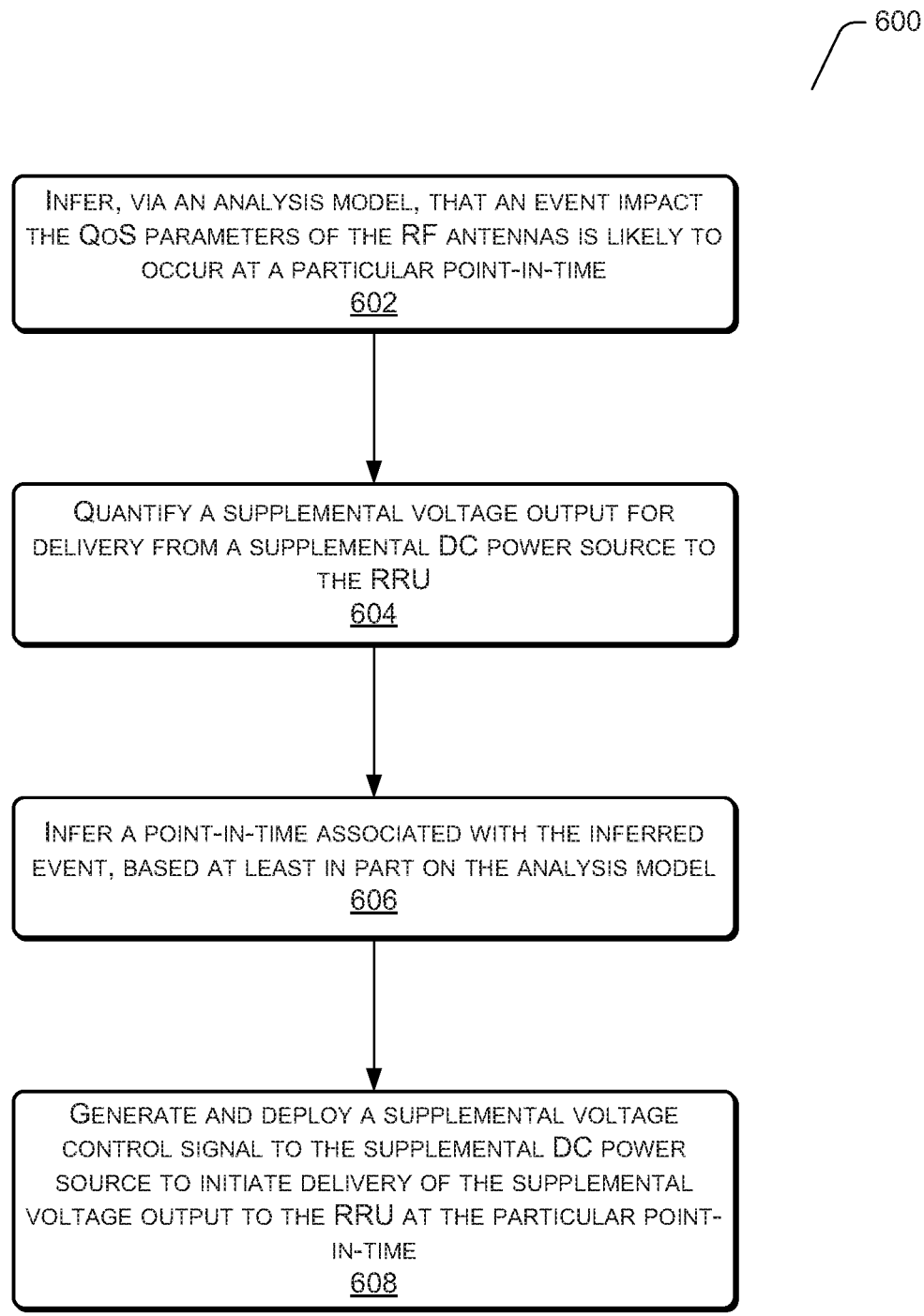
FIG. 6 illustrates a Supplemental Voltage (SV) controller process for initiating a supplemental voltage output from a supplemental DC power source at a point-in-time prior to an inferred power interruption event that impacts an operation of RF antennas.

FIG. 6 illustrates a Supplemental Voltage (SV) controller process for initiating a supplemental voltage output from a Supplemental DC power source at a point-in-time prior to an inferred power interruption event that may impact an operation of the RF antennas. In some examples, the inferred power interruption may correspond to anticipated network congestion or a forecast meteorological event.

At 602, the SV controller may infer, via an analysis model, that an event impacting the QoS parameters of the RF antennas is likely to occur at a particular point-in-time. More specifically, the AVM controller may infer the occurrence of a power interruption event by employing one or more machine learning algorithms to correlate current environmental metadata with data-points of an analysis model.

At 604, the SV controller may quantify, via the analysis model, a supplemental voltage output for delivery from a supplemental DC power source to the RRU, based at least in part on the inferred power interruption event.

At 606, the SV controller may infer a point-in-time associated with the inferred power interruption event. An inference of the point-in-time at which the power interruption event is likely to occur may be based on the current environmental metadata (i.e. forecast of the meteorological event) or a correlation of the current environmental metadata with a data-point of the analysis model (i.e. impending network congestion).

At 608, the SV controller may generate and deploy a supplemental voltage control signal to the supplemental DC power source that causes the supplemental DC power source to transmit the supplemental voltage output to the RRU at the inferred point-in-time.

Figure 7:
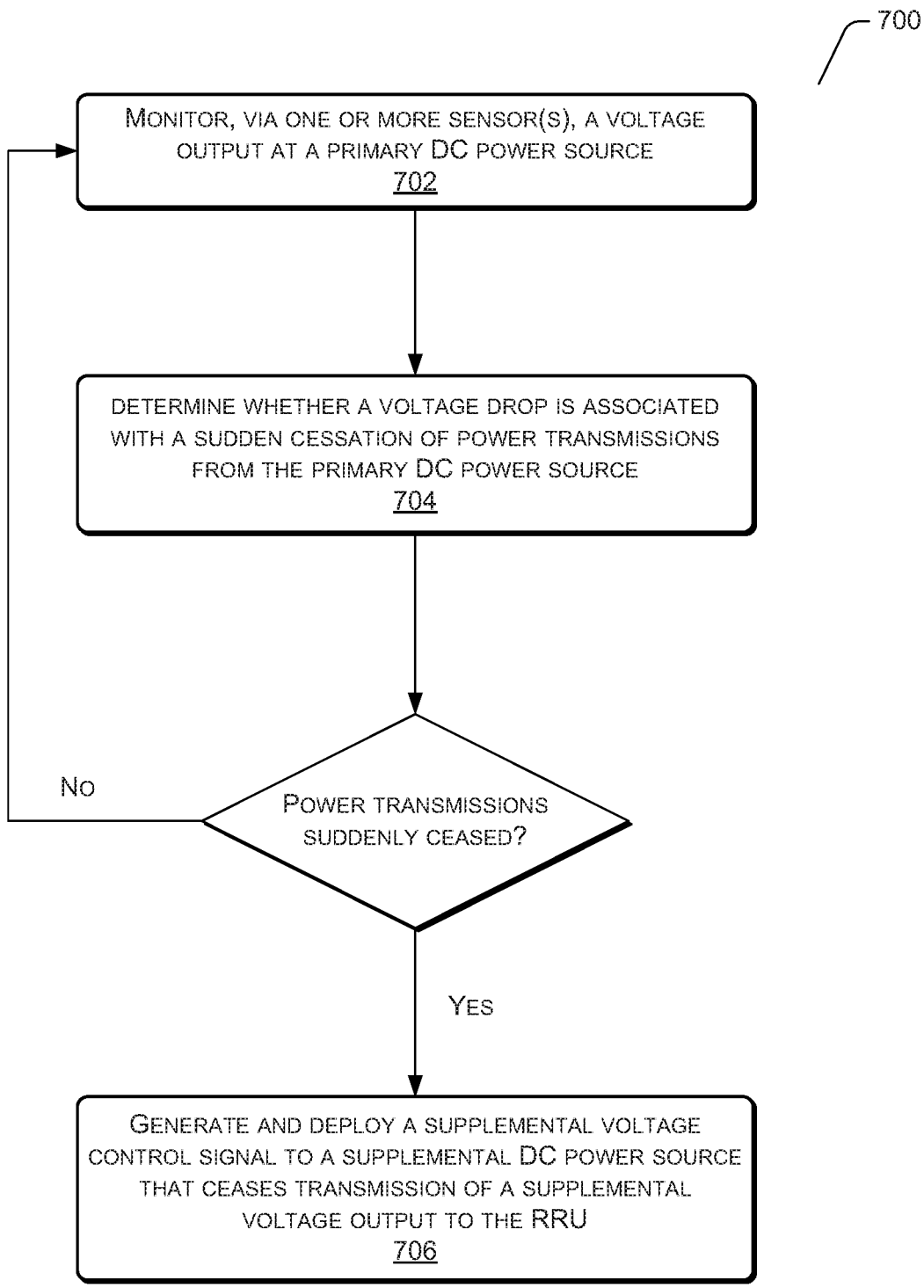
FIG. 7 illustrates a Supplemental Voltage (SV) controller process for selectively ceasing transmission of a supplemental voltage output from a supplemental DC power source in response to a detecting a power interruption at a primary DC power source.

FIG. 7 illustrates a Supplemental Voltage (SV) controller process for selectively ceasing transmission of a supplemental voltage output from a supplemental DC power source in response to a detecting a power interruption at a primary DC power source. In some examples, a sudden drop of voltage from the primary DC power source may reflect a system restart, a backhaul failure, or an intervening action that is intended to cease any and all power transmissions to the RF antennas. Process 700 is intended to ensure that in the event that a power transmission from the primary DC power source is cut off, the supplemental DC power source does not inadvertently compensate for the loss with a supplemental voltage output.

At 702, the SV controller may monitor, via one or more sensor(s), the primary voltage output from the primary DC power source. The one or more sensor(s) may be hall effect sensors that are positioned adjacent to the primary DC power source.

At 704, the SV controller may analyze sensor data from the one or more sensor(s) to determine whether a voltage drop is associated with a sudden cessation of power transmissions from the primary DC power source. In one example, the SV controller may determine whether a rate of change of a voltage drop at the primary DC power source is greater than or equal to a predetermined voltage rate threshold. A rapid drop in voltage (i.e. a high negative rate of change) may indicate a sudden cessation of power transmissions from the primary DC power source. In another example, the SV controller may determine whether the primary voltage output at the primary DC power source has fallen below a predetermined minimum threshold, as set by an operator of the SV controller or an administrator of the telecommunications network.

At 706, the SV controller may determine that the power transmissions at the primary DC power source have suddenly ceased, based at least in part on an analysis of the sensor data. In doing so, the SV controller may generate and deploy a supplemental voltage control signal to the supplemental DC power source that causes the supplemental DC power source to cease transmission of a supplemental voltage output to the RRU.

Alternatively, the SV controller may determine that the power transmissions at the primary DC power source have not suddenly ceased, and have only degraded, based at least in part on the analysis of the sensor data. In this instance, process 700 may return to step 702 and the SV controller may continue to monitor, via one or more sensor(s), the primary voltage output at the primary DC power source. Process 700 may also selectively bridge with processes 300 or 400 to determine whether a supplemental voltage output is required to compensate for a voltage drop at the primary DC power source.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:
1. A system comprising:
one or more processors;
memory coupled to the one or more processors, the memory including one or more modules that are executable by the one or more processors to:
monitor, via one or more sensors, an initial voltage output of a power transmission at a Remote Radio Unit

(RRU), the power transmission being sourced from at least a primary Direct Current (DC) power source that is coupled to the RRU;

determine whether the initial voltage output is less than a predetermined voltage threshold;

in response to determining that the initial voltage output is less than the predetermined voltage threshold, calculate a supplemental voltage output based at least in part on a first voltage loss and a second voltage loss, the first voltage loss occurring between the primary DC power source and the RRU and the second voltage loss occurring between a supplemental DC power source and the RRU; and generate a supplemental voltage control signal for transmission to the supplemental DC power source that is coupled to the RRU, the supplemental voltage control signal including instructions that cause the supplemental DC power source to transmit the supplemental voltage output to the RRU.

2. The system of claim 1, wherein the one or more sensors are configured to measure a primary voltage output from the primary DC power source, and wherein the one or more modules are further executable by the one or more processors to:

capture, from the one or more sensors, the primary voltage output from the primary DC power source;

retrieve, from a data store, a voltage compensation table that defines voltage losses between the primary DC power source and the RRU; and determine a voltage loss that is associated with transmission of the primary voltage output from the primary DC power source to the RRU, based at least in part on the voltage compensation table, and wherein, the initial voltage output of the power transmission at the RRU is based at least in part on the primary voltage output and the voltage loss.

3. The system of claim 1, wherein the one or more sensors comprise at least one hall effect sensor that is positioned adjacent to the RRU to unobtrusively measure the initial voltage output of the power transmission in an electrically conductive cable coupled to the RRU.

4. The system of claim 1, wherein the one or more modules are further executable by the one or more processors to:

retrieve, from a data store, historical environmental metadata associated with an operation of one or more Radio Frequency (RF) antennas associated with the RRU;

capture current environmental metadata associated with the operation of the one or more RF antennas, the current environmental metadata indicating instances of one or more of network congestion, network impediments, DC power source impediments, or meteorological events that impact the power transmission to the RRU;

analyze the current environmental metadata by identifying data patterns between the current environmental metadata and individual instances of the historical environmental metadata;

generate a similarity score for the individual instances of the historical environmental metadata based at least in part on identified data patterns with the current environmental metadata; and determine that the similarity score for a particular instance of historical environmental metadata of the historical environmental metadata is greater than or equal to a predetermined similarity threshold, and wherein, the supplemental voltage output is based at least in part on a particular instance of the historical environmental metadata.

5. The system of claim 4, wherein the current environmental metadata further includes one or more Quality of Service (QoS) parameters associated with signal data transmitted by one or more RF antennas associated with the RRU, the one or more QoS parameters relating to one or more of packet loss, latency, jitter, echo, downlink throughput, or uplink throughput.

6. The system of claim 1, wherein the one or more modules are further executable by the one or more processors to:

retrieve, from a data store, historical power transmission data associated with an operation of one or more RF antennas associated with the RRU, the historical power transmission data including instances of primary voltage output from the primary DC power source, instances of supplemental voltage output from the supplemental DC power source, and a net voltage delivered to the RRU; and analyze the initial voltage output of the power transmission at the RRU by identifying data patterns with the historical power transmission data, and wherein, to determine the supplemental voltage output is further based at least in part on the data patterns between the initial voltage output of the power transmission and the historical power transmission data.

7. The system of claim 6, wherein the historical power transmission data further includes corresponding historical instances of environmental metadata, and wherein the one or more modules are further executable by the one or more processors to:

capture current environmental metadata associated with the operation of the one or more RF antennas, the current environmental metadata including at least one of a current time of day or a current day of week, and wherein, to determine the supplemental voltage output is further based at least in part on at least one of the current time of day or the current day of week.

8. The system of claim 1, wherein the one or more modules are further executable by the one or more processors to:

retrieve, from a data store, historical power transmission data associated with an operation of one or more RF antennas associated with the RRU; and generate an analysis model, based at least in part on the historical power transmission data, and wherein to determine the supplemental voltage output is further based at least in part on a correlation of the initial voltage output with data-points of the analysis model.

9. The system of claim 8, wherein the one or more modules are further executable by the one or more processors to:

retrieve, from the data store, historical environmental metadata that corresponds to the historical power transmission data, the historical environmental metadata including historical instances of network congestion, network impediments, DC power source impediments, or meteorological events that impact the operation of the one or more RF antennas, and wherein to generate the analysis model is further based at least in part on the historical environmental metadata.

10. The system of claim 1, wherein the one or more modules are further executable by the one or more processors to:

monitor, via one or more sensors, a primary voltage output at the primary DC power source over a predetermined time interval;

identify a voltage drop associated with the primary voltage output that occurs at the primary DC power source within the predetermined time interval;

determine that a rate of the voltage drop is greater than a predetermined voltage rate threshold; and generate an additional supplemental voltage control signal for transmission to the supplemental DC power source, the additional supplemental voltage control signal including instructions that cause the supplemental DC power source to cease transmission of the supplemental voltage output to the RRU.

11. The system of claim 1, wherein the one or more modules are further executable by the one or more processors to:

calculate an aggregated voltage output that comprises an aggregate of the initial voltage output and the supplemental voltage output, and wherein, to calculate the supplemental voltage output is further based at least in part on whether the aggregated voltage output is greater than or equal to the predetermined voltage threshold.

12. One or more non-transitory computer-readable media storing computer-executable instructions that, when executed on one or more processors, cause the one or more processors to perform acts comprising:

determining an initial net-voltage output of a power transmission at a Remote Radio Unit (RRU), the power transmission being delivered from a primary Direct Current (DC) power source;

determining that the initial net-voltage output is less than a predetermined voltage threshold;

calculating a supplemental voltage output for transmission to the RRU from a supplemental DC power source, the supplemental voltage output, based at least in part on a voltage loss that occurs during transmission of the supplemental voltage output to the RRU; and generating and deploying a supplemental voltage control signal for transmission to the supplemental DC power source, the supplemental voltage control signal including a supplemental control signal that cause the supplemental DC power source to deliver the supplemental voltage output to the RRU.

13. The one or more non-transitory computer-readable media of claim 12, further storing instructions to perform acts comprising:

retrieving, from a data store, empirical data associated with an electrically conductive cable that couples the supplemental DC power source and the RRU;

wherein, calculating the supplemental voltage output is further based at least in part on the empirical data.

14. The one or more non-transitory computer-readable media of claim 12, further storing instructions to perform acts comprising:

monitoring, via one or more sensors, the initial net-voltage output of the power transmission at the RRU, the one or more sensors corresponding to hall effect sensors that are positioned adjacent to the RRU.

15. The one or more non-transitory computer-readable media of claim 12, further storing instructions to perform acts comprising:

identifying a voltage drop in a primary voltage output at the primary DC power source;

determining that the primary voltage output at the primary DC power source is less than a predetermined minimum voltage; and generating an additional supplemental voltage control signal for transmission to the supplemental DC power source, the additional supplemental voltage control signal including instructions that cause the supplemental DC power source to cease transmission of the supplemental voltage output to the RRU.

16. The one or more non-transitory computer-readable media of claim 12, further storing instructions to perform acts comprising:

capturing current environmental metadata associated with an operation of one or more RF antennas associated with the RRU, the current environmental metadata including one or more indications of network congestion, network impediments, DC power source impediments, or meteorological events likely to impact a current operation of the one or more RF antennas;

retrieving, from a data store, historical power transmission data and corresponding historical instances of environmental metadata associated with the one or more RF antennas; and generating an analysis model that correlates the historical power transmission data and the corresponding historical instances of environmental metadata, and wherein, calculating the supplemental voltage output for transmission to the one or more RF antennas is based at least in part on a correlation of the current environmental metadata and data-points of the analysis model.

17. The one or more non-transitory computer-readable media of claim 16, further storing instructions to perform acts comprising:

inferring that a power interruption event is likely to impact a future operation of the one or more RF antennas, based at least in part on the correlation of the current environmental metadata and the data-points of the analysis model, and wherein, calculating the supplemental voltage output is based at least in part on an inference of the power interruption event.

* * * * *